United States Patent
Brown-Canary Lawson et al.

(10) Patent No.: US 6,484,665 B1
(45) Date of Patent: Nov. 26, 2002

(54) REDUCED COMPRESSION GRAVITY-FEED CLEAN FOOD-RECYCLING SYSTEM WITH MANICURING PERCH FOR A BIRD FEEDER

(75) Inventors: Brenda Brown-Canary Lawson, Edmond, OK (US); John T. Lawson, Edmond, OK (US); Kathryn Kerr-Kunc, Edmond, OK (US)

(73) Assignee: Birdcare Inventions, L.L.C., Edmond, OK (US)

( * ) Notice: Subject to any disclaimer, the term of this patent is extended or adjusted under 35 U.S.C. 154(b) by 0 days.

(21) Appl. No.: 09/916,620

(22) Filed: Jul. 27, 2001

(51) Int. Cl.[7] ............................................. A01K 61/02
(52) U.S. Cl. ...................... 119/52.2; 119/57.8; 119/621
(58) Field of Search ................. 119/52.2, 459, 119/464, 468, 467, 469, 475, 476, 477, 51.12, 52.1, 57.8, 900, 174, 26, 164, 17, 52.3, 24, 22, 23, 25, 706; D30/119

(56) References Cited

U.S. PATENT DOCUMENTS

| | | | | |
|---|---|---|---|---|
| 254,254 A | * | 2/1882 | Bagot | 119/468 |
| 447,769 A | * | 3/1891 | Goe | 119/468 |
| 1,297,811 A | * | 3/1919 | Ebbels | 119/468 |
| 1,331,908 A | * | 2/1920 | Frey | 119/468 |
| 2,031,874 A | * | 2/1936 | Butler et al. | 119/464 |
| 2,532,726 A | * | 12/1950 | Lajoie et al. | 119/52.2 |
| 3,119,372 A | * | 1/1964 | Gantz | 119/465 |
| 3,441,002 A | * | 4/1969 | Lawlin et al. | 119/430 |
| 3,919,977 A | * | 11/1975 | Clark | 119/464 |
| 4,328,765 A | * | 5/1982 | Kilham | 119/57.8 |
| 4,401,056 A | * | 8/1983 | Cody et al. | 119/477 |
| 4,432,304 A | * | 2/1984 | Johnsson | 119/477 |
| 5,018,480 A | | 5/1991 | Goldman et al. | |
| 5,156,640 A | | 10/1992 | Del Rosario | |
| 5,289,796 A | | 3/1994 | Armstrong | |
| 5,381,758 A | | 1/1995 | Simon | |
| 5,568,792 A | | 10/1996 | Lynch | |
| 5,771,838 A | * | 6/1998 | Bloom et al. | 119/464 |
| 5,992,349 A | * | 11/1999 | Sachs | 119/52.1 |
| D437,979 S | * | 2/2001 | Lian | D30/119 |
| 6,332,431 B1 | * | 12/2001 | Brown | 119/600 |

FOREIGN PATENT DOCUMENTS

WO     WO 89/08388    * 9/1989    ............ A01K/5/02

* cited by examiner

Primary Examiner—Peter M. Poon
Assistant Examiner—Andrea Valenti
(74) Attorney, Agent, or Firm—Fellers, Snider, et al.

(57) ABSTRACT

A feeder having a reduced compression gravity-feed clean food-recycling system providing clean food for a bird including a pair of side panels; a manicuring perch with a serrated surface adjacent the side panels for wearing down a toenail of the bird while feeding; a manger floor with a pair of particle egress notches adjacent the pair of side panels supporting the clean food; a pair of settling slots established by the pair of particle egress notches, the manger floor and the pair of side panels passing particles of food; a manger stop adjacent the manger floor for confining the clean food; a catch encompassed by the pair of side panels, the manicuring perch, the settling slots and the manger stop accommodating clean food spilled or discarded by the bird; and a reclamation slide adjacent the side panels for collecting food and food particles.

24 Claims, 4 Drawing Sheets

US 6,484,665 B1

REDUCED COMPRESSION GRAVITY-FEED CLEAN FOOD-RECYCLING SYSTEM WITH MANICURING PERCH FOR A BIRD FEEDER

RELATED APPLICATIONS

There are no prior applications related to this application.

FIELD OF THE INVENTION

This invention relates generally to the field of animal feeders, and more particularly, but not by way of limitation, to reduced compression gravity-feed clean food-recycling system for a bird feeder with an ability to protect the food from fecal contamination.

BACKGROUND

Man has kept birds since the beginning of time, and has been faced with the same problem since man put the first bird in a cage. The problem being how to keep an adequate supply of food before the bird at all times, in spite of the bird's habit of throwing it out.

Typically birds are fed out of small, open, lightweight containers sized by the cage manufacturers to fit through slots in the cage wire and held in place by wire doors, and referred to as feed bowls. Very quickly the bird finds other uses for these as push-pull or chew toys. It becomes a battle of wills between bird and owner to keep the food bowl in place. Ultimately the owner usually loses and resorts to using cereal bowls or heavy crock bowls that the bird should not be able to move or dump, but does. At the end of the day the bird is without food and the frustrated owner refills the open bowl, knowing full well that such a feeding method is totally inadequate and inefficient.

For the owner of one bird, the feed bowl problem with resulting clean up of the cage, and the immediate surrounding area, is sufficiently frustrating. For breeders with perhaps hundreds of birds, the problem becomes life threatening to the birds, their hatchling and perhaps a significant health risk to the owner, as a result of sweeping moldy feed off the floor. In addition to the health risk, such food waste can cause severe economic loss to the breeder and is ultimately reflected in the price of pet birds. Many breeders have resorted to rabbit type feeders: gravity feeders made of tin with small trays that the food drops into. But the same problem exists with these as with open feeders. The bird often digs out every bit of food and throws it all over the room, looking for that favorite piece.

Why are birds prone to this wasteful behavior? In the wild, birds forage and gather as a primary part of their daily routine. They browse on the ground, in trees and bushes, over and under rocks and leaves for food. They even search under the ground for their favorite morsels, scratching up topsoil and picking for seeds underneath. They search for their favorite foods and only accept second choice after they are satisfied that their favorite is unavailable. The universal favorite of almost all birds is sunflower seeds. Many cage birds will empty a full bowl of bird food, throwing it everywhere, as they eat only the sunflower seeds out of it.

Limited access gravity feeders, such as the rabbit type described above, have been around for many years. An alternate approach is exemplified by U.S. Pat. No. 5,771,838 issued to by Bloom et al. (Bloom '838) proposes a bird feeder with a recapture reservoir. However, neither the gravity type rabbit feeders nor Bloom '838 limit contamination of the food pan with bird droppings. Once the food pan is contaminated, it must be washed to stop the spread of germs. This often requires a major intrusion into the cage with tools, pliers, wrenches, etc. to remove the, bolts, washers, wing nuts, which commonly secure these devices to the cage. Such intrusions, while disturbing to pets, can cause major upsets for breeding birds, including the cessation of breeding activity and even the killing, or worse, maiming, of the young in the nest.

Another problem with these rabbit-type metal-gravity feeders is that they are opaque and cannot be seen through. They also have straight walls, which can cause the feed to compress at the bottom and become plugged. Because the feed is hidden, birds can die before the plug is discovered. Even in the transparent acrylic feeders, compression induced feed stoppage is still a problem.

Still another problem existing in the prior art, including Bloom '838, is that of the feed trough being too flat, or angled so slightly that the food dust settles in the corners and has to be chipped out with an instrument such as a screwdriver, and are void of cleaning ports. Old food stuck in the corners of any feeder often molds. Mold can cause several serious respiratory conditions in birds and humans alike.

Thus, challenges remain and needs persist to provide an improved bird feeder that will trap displaced and thrown feed, that addresses the problem of compression of the feed, which will substantially eliminate direct feed contamination, that can be re-supplied from outside a cage or enclosure, and that can be removed for cleaning from outside the cage or enclosure absent a need for tools.

SUMMARY OF THE INVENTION

An embodiment of the present invention provides a feeder having a reduced compression gravity-feed clean food-recycling system providing clean food for a bird including a pair of side panels; a manicuring perch with a serrated surface adjacent the side panels for wearing down a toenail of the bird while feeding; a manger floor with a pair of particle egress notches adjacent the pair of side panels supporting the clean food; a pair of settling slots established by the pair of particle egress notches, the manger floor and the pair of side panels passing particles of food; a manger stop adjacent the manger floor for confining the clean food; a catch encompassed by the pair of side panels, the manicuring perch, the settling slots and the manger stop accommodating clean food spilled or discarded by the bird; and a reclamation slide adjacent the side panels for collecting food and food particles.

An embodiment of the feeder is built by steps that include providing a sheet of material for use in producing component parts of the feeder; separating each component part of the feeder from the sheet of material; collecting and pre-staging select component parts into an assembly kit specific to a bird species; notching a particle egress notch into a manger floor for use in forming a settling slot; embedding a serrated pattern into a manicuring perch to provide a means for manicuring a toenail of the bird while the bird feeds from the feeder; forming the manicuring perch into a predetermined shape sized to accommodate the grasp of the bird; placing each component part onto an assembly fixture and linking the components one to the other to form the feeder; and removing the linked components from the assembly fixture and installing a reclamation-stop-door to form the feeder.

These and various other features and advantages, which characterize the present invention, will be apparent from a reading of the following detailed description and a review of the associated drawings.

DETAILED DESCRIPTION

Figure 1:
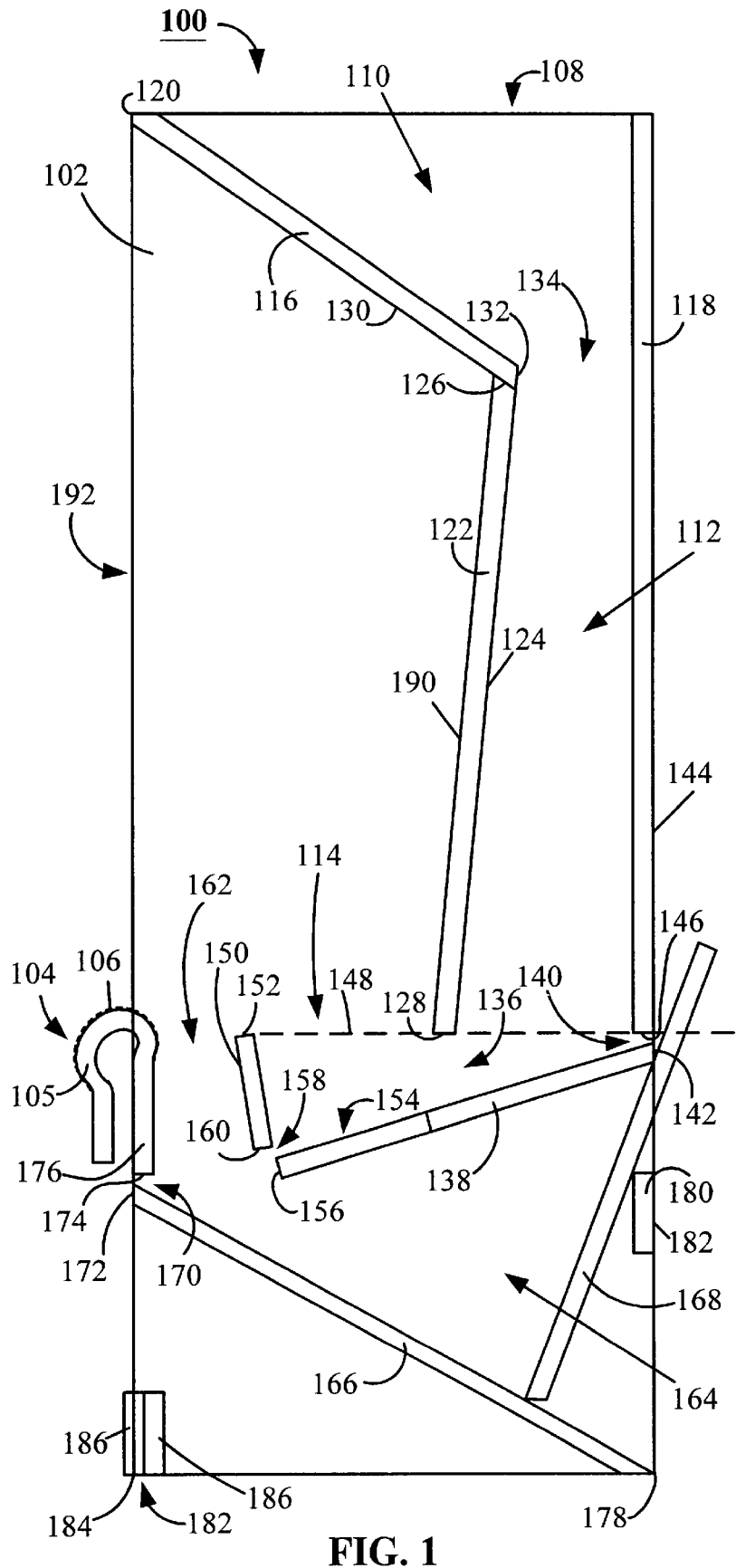
FIG. 1 is an elevational side view of a feeder constructed in accordance with a preferred embodiment of the present invention.

Referring to the drawings in general, and more particularly to FIG. 1, shown therein is an elevational side view of a feeder 100 constructed in accordance with an embodiment of the present invention. Included in the feeder 100 is a pair of side panels 102 that define the height and depth of the feeder 100. The height and depth of the side panels 102 depends on the species of bird the feeder 100 is constructed to serve. The feeder 100 is constructed to restrict movement of the bird, in a non-aversive manner, by allowing sufficient room for the bird to enter the feeder 100 for feeding and play, but with insufficient room within the feeder 100 for the bird in which to turn around, thereby effectively protecting the food from the bird's droppings.

A feeder 100 sized for the smallest Finch would not accommodate the needs of the largest Macaw and hamper the birds access to food. And use by the Finch of a feeder 100 sized for the largest Macaw would defeat a purpose of the invention. Although the Finch would have unencumbered access to the food, there would be sufficient room within the feeder 100 sized for the largest Macaw for the Finch to turn around and defecate in the food.

The size, shape, features and eating habits of a bird species contribute directly to the size, shape and placement of a manicuring perch mounting hook 104 relative to the pair of side panels 102. The manicuring perch mounting hook 104 has a main body portion 105 with a thickness determined by the species of bird intended to use feeder, and from an outside surface 106 of the manicuring perch mounting hook 104, a minimum head clearance and ergonomic placement of food consistent with eating habits of the bird species, the feeder 100 is sized to serve, is determined. A nominal maximum width of the bird species, in a perched position, the feeder 100 is sized to serve, plus between 10% and 15% of that nominal maximum width, determines the width of the manicuring perch mounting hook 104. The width of the manicuring perch mounting hook 104 defines the spacing between the pair of side panels 102 as well as a maximum width for remaining components sandwiched between the pair of side panels.

From the minimum head clearance, ergonomic food placement considerations and width of the manicuring perch mounting hook 104, placement of a food dispenser portion 108 of the feeder 100, relative to the outer surface 106 of the manicuring perch mounting hook 104 is determined. The food dispenser portion 108 includes a hopper portion 110 communicating with a silo portion 112 that in turn communicates with a manger portion 114.

The hopper portion 110 is defined by a feeding slide 116 sandwiched between the pair of side panels 102 and a food dispenser 118. The feeding slide 116, which starts at a top front corner 120 of each of the pair of side panels 102 and angles downward at about a 35 degree angle from a top edge 120 of each of the pair of side panels 102, communicates with a sloped volume control wall 122 of the silo portion 112. An inner surface 124, between a top edge 126 and a bottom edge 128 of the sloped volume control wall 122 slopes away from the food dispenser back 118 at an angle of between 3 and 5 degrees. Collectively, the sloped volume control wall 122, the pair of side panels 102 and the food dispenser back 118 defines the silo portion 112 of the feeder 100. Expansion in volumetric space from the top edge 126 to the bottom edge 128, within the silo portion 112, prevents food compression within the food dispenser portion 108.

In communicating with the sloped volume control wall 122, an outside surface 130 of the feeding slide 116 covers the top edge 126 of the sloped volume control wall 122, while a bottom edge 132 of the feeding slide 116 lies in the same plane as the inner surface 124 of the sloped volume control wall 122. A feed entry throat 134 allows flow of feed between the hopper portion 110 and the silo portion 112. The feed entry throat is bounded by the bottom edge 132 of the feeding slide 116, the food dispenser back 118 and the pair of side panels 102. The feed entry throat 134, is sized to easily accommodate a largest dimension of an intact piece of food of bird feed recommended for feeding the bird species the feeder 100 is intended to serve.

A feed exit throat 136 allows flow of feed between the silo portion 110 and the manger portion 112. The feed exit throat is bounded by the bottom edge 128 of the sloped volume control wall 122, the pair of side panels 102 and a manger floor 138. As with the feed entry throat 134, the feed exit throat 136 is sized to easily accommodate a largest dimension of an intact piece of food of bird feed recommended for feeding the bird species the feeder 100 is intended to serve.

In mounting the manger floor 138 between the pair of side panels 102, a small air space or first cleaning port 140 of between 0.78 cm. and 1.56 cm. is provided between the food dispenser back 118 and the manger floor 138, for cleaning the feeder using compressed air. To form the first cleaning port 140, a back edge 142 of the manger floor 138 lies in a same plane as an external surface 144 of the food dispenser back 118 and is offset from a bottom edge 146 of the food dispenser back 118 by between 0.78 cm. and 1.58 cm. The bottom edge 146 of the food dispenser back 118 and the bottom edge 128 of the sloped volume control wall 122 lie in a common horizontal plane 148 (shown by dashed line 148) and the manger floor 138, starting from the back edge 142, has a downward slope away from the common horizontal plane 148 of between 30 and 35 degrees.

A manger stop 150 is provided to contain the feed that flows through the feed exit throat 136 from the silo 112 and into the manger portion 114. A top edge 152 of the manger stop 150 lies in the common horizontal plane 148 with the bottom edge 128 of the sloped volume control wall 122 and is positioned in a plane parallel to a plane of the food dispenser back 118. Maintaining the top edge 152 of the manger stop 150 in the same plane as the bottom edge 128 of the sloped volume control wall 122 precludes food from spewing out of the manger portion 114 when filling or replenishing the food dispenser portion 108 with feed.

The manger floor 138 includes a pair of settling slots 154, one adjacent each of the pair of side panels 102, and a front edge 156 adjacent a second cleaning port 158. The second cleaning port 158 is bounded by the pair of side panels 102 along each side, the front edge 156 of the manger floor 138 along the bottom, and a lower edge 160 of the manger stop 150 along the top. The second cleaning port 158 has a spacing of between 0.78 cm. and 1.56 cm. separating the front edge 156 of the manger floor 138 and the lower edge 160 of the manger stop 150. Each of the pair of settling slots 154 commence at a distance of between 50% and 75% of a distance between the back edge 142 and the front edge 156 starting from the back edge 142 and terminate at the front edge 156 of the manger floor 138. The manger stop 150 is ergonomically positioned a distance from the manicuring perch hook mount 104 to accommodate the eating habits of the bird species the feeder 100 is intended to serve.

When the manger stop 150 is secured between the pair of side panels 102, a catch 162 is formed between the manger stop 150 and the manicuring perch 104 that has a spacing of not less than substantially the same as the spacing of the feed exit throat 136. The catch 162 communicates with a food recovery reservoir 164, used to collect food rejected by the bird and pieces of food that broke off during feeding.

The manger floor 138 and the catch 162 bound the food recovery reservoir 164 on the top, the pair of side panels 102 bound the food recovery reservoir 164 on the sides, a reclamation slid 166 bounds the food recovery reservoir 164 on the bottom, while a reclamation-stop-door 168 bounds the food recovery reservoir 164 on the back. The reclamation slid 166 is secured between the pair of side panels 102 to form a third cleaning port 170 with a spacing of between 0.78 cm. and 1.56 cm. separating a front edge 172 of the reclamation slid 166 and a lower edge 174 of an anchor leg 176 of the manicuring perch mounting hook 104. It is noted that each of the three cleaning ports 140, 158 and 170 lies in a common diagonal plane.

The reclamation slide 166 extends from its front edge 172, adjacent the third cleaning port 170, in a downward sloping fashion and communicates with a lower rear corner 178 of each of the pair of side panels 102 at an attack angle of between 30 degrees and 60 degrees from a horizontal plane bisecting the cleaning port 170.

The reclamation-stop-door 168 abuts against the reclamation slide 166 and is torsionally supported by the back edge 142 of the manger floor 138 and a reclamation brace 180. The reclamation brace 180 is mounted between the pair of side panels 102, and between 65% and 80% of the distance from each lower rear corner 178 of each of the pair of side panels 102 and the first cleaning port 140. A back edge 182 of the reclamation brace 180 lies in the same plane as the back edge 142 of the manger floor 138. A length of the reclamation-stop-door 168 is determined by the overall size of the bird feeder 100, but in all cases the reclamation-stop-door 168 protrudes out of the back edge 142 of the manger floor 138 a distance sufficient to allow the reclamation-stop-door 168 to be comfortably grasped by a bird owner and raised when performing a feed reclamation process.

A stabilizing bumper 182 is formed from at least one brace member or component part 186. The stabilizing bumper 182 is mounted adjacent a pair of front lower corners 184 of the pair of side panels 102. The stabilizing bumper imparts a torsional force on the top front corner 120 of each of the pair of side panels 102 by engaging the manicuring perch mounting hook 104 as a pivot point. The quantity of bumpers used depends on the size and weight of the bird feeder, the bird, and the shape and rigidity of the cage. The length, width and height of each brace member or component part 186 are substantially the same as the length, width and height of the reclamation brace 180. The outer surface 130 of the feeding slide 116, an outer surface 190 of the sloped volume control wall 122, the manger portion 114, the manicuring perch mounting hook 104 and the pair of side panels 102 define the confines of a feeding-recreation chamber 192.

Figure 2:
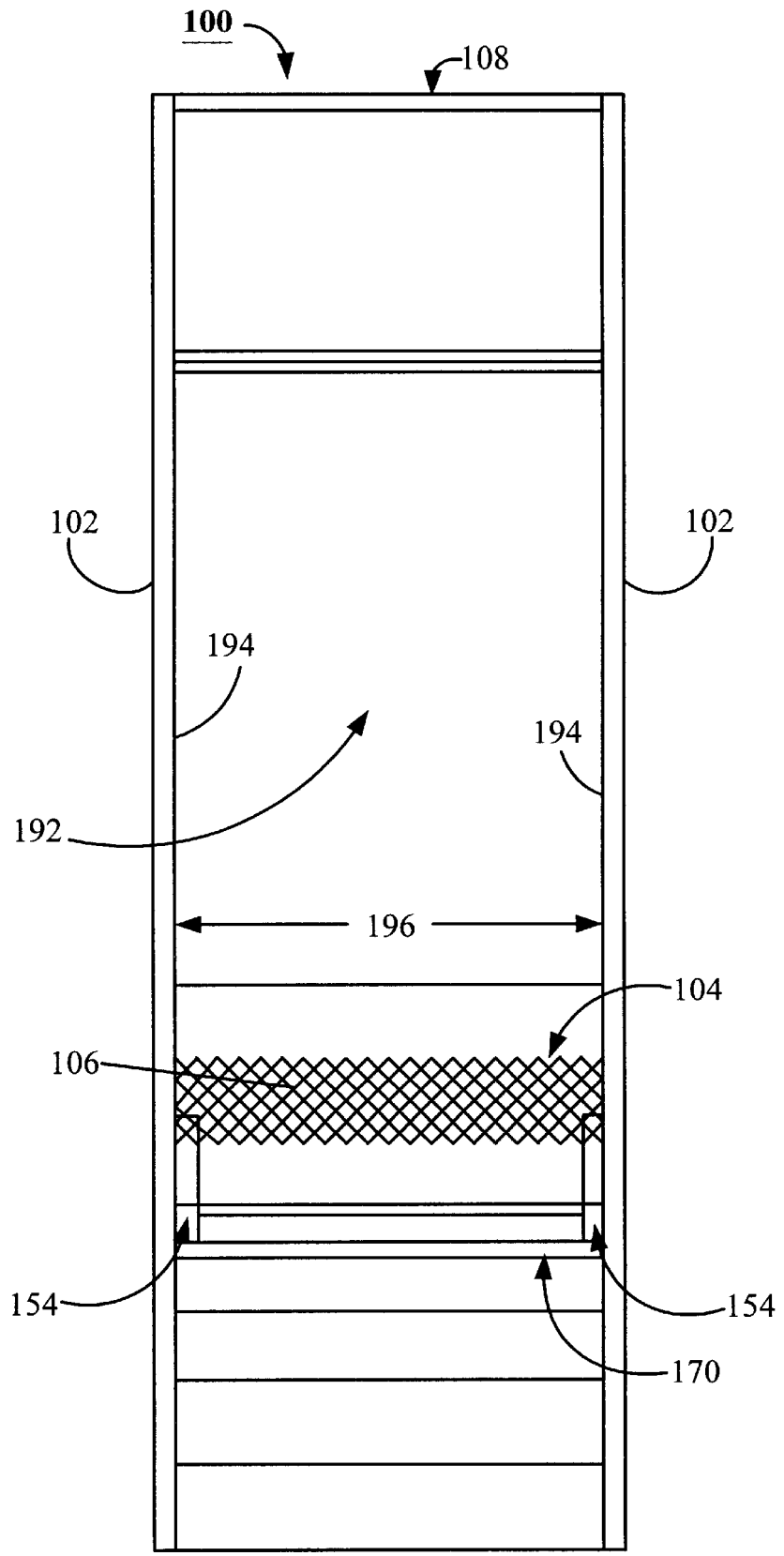
FIG. 2 is an elevational front view of the feeder of FIG. 1.

FIG. 2 shows that every component part is sandwiched between the pair of side panels 102. The pair of settling slot 154 is shown adjacent the pair of side panels 102. These settling slots are specifically designed to mitigate a prior art deficiency, which is, the entrapment of dust particles from the feed that tends to accumulate in the corners, mold, harden and needs to be chipped out with an instrument such as a screwdriver.

In the present embodiment, feeder 100 is constructed of transparent or translucent material, such as an acrylic, to allow the feed levels in portion of the food dispenser portion 108 to be readily seen and also to give the bird a picture window on the world, a view without bars. It will be understood that many materials such as metal, wood, and plastic, etc., can be used to fabricate this feeder 100 and they need not be transparent. Furthermore, the feeder can be fabricated in many different ways such as by coupling many elements together or molding in pieces or portions in their entirety. However, using transparent acrylic, the bird's feeding-recreation chamber 192, with its transparent pair of side panels 102 on either side, becomes a favorite perch for most. There they have a view without bars in two directions. This is also an improvement over the prior art.

At the bottom of the feeding-recreation chamber 192, on the front side of the feeder, sandwiched between and attached to the pair of inner surfaces 194, the manicuring perch mounting hook 104 is situated at the top edge of the outside surface 106 approximately ¼ to 1 inch (depending on the relative size of the feeder) above the top edge 152 of the manger stop 150 (of FIG. 1). The manicuring perch mounting hook 104 is embossed with a nail file pattern using a heat stamping process to produce a serrated surface. An embodiment of the serrated surface, shown in cross hatch, is heat stamped on the outside surface 106 of the manicuring perch mounting hook 104, and extends for an adequate distance down both sides of the top surface 106. The serrated surface is used to wear the bird's toe-nails off as he stands and moves about on the perch to feed. The bird's gripping and changing positions on the perch wears his nails—just as they would be in the normal food gathering process, as he is eating out of the manger portion 114 (of FIG. 1) of the food dispenser portion 108 (of FIG. 1).

A width 196 of the opening into the feeding-recreation chamber 192, between the pair of side panels 102, is an important factor involved in keeping the reclaimable feed uncontaminated by feces. The opening 196 is specifically sized to the specific species of bird being fed from feeder 100, so that a bird of that size does not have room to turn his tail into the feeder and defecate on the food. The correct sizing of this opening alone represents a very important improvement over the prior art.

Figure 3:
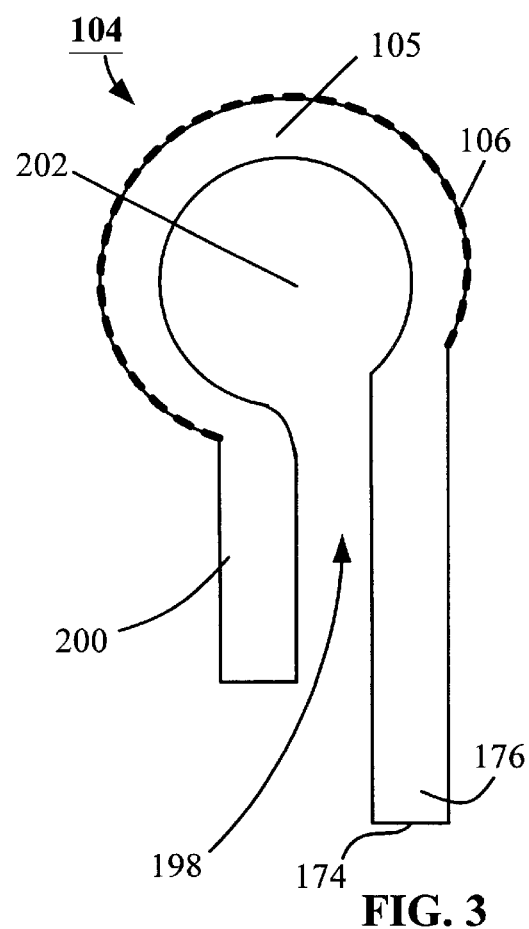
FIG. 3 is an elevational end view showing a manicuring perch mounting hook of the feeder of FIG. 2.

Turning to FIG. 3, a hook portion 198 of the manicuring perch mounting hook 104 is the only means by which the feeder 100 (of FIG. 1) is attached to the cage. It extends into the inside of any wire or barred enclosure and affords secure attachment without the use of screws, washers, wing nuts or tools. The hook portion 198 includes an outer containment leg 200, an eye 202 and the anchor leg 176. The anchor leg 176 forms the major front partition of the feeder as well as the opposing side of the hook to anchor the feeder securely to the cage. The manicuring perch mounting hook 104 is positioned above the third cleaning port 170.

The mounting hook is formed by placing the manicuring perch mounting hook 104 into a manicuring perch forming fixture (not shown) shaped to accommodate the grasp of the bird, of the species of bird, using the feeder. Next, heat is applied to the manicuring perch mounting hook, to bring the manicuring perch mounting hook 104 to a point of malleability to allow the manicuring perch mounting hook 104 to be deformed. Deforming the manicuring perch mounting hook 104 around a shape tool (not shown), while maintaining the heat applied to the manicuring perch mounting hook 104, sufficient to maintain malleability of the manicuring perch mounting hook 104 while applying force to the manicuring perch mounting hook 104 to form the manicuring perch mounting hook 104.

Returning to FIG. 1, in use, the bird stands on the manicuring perch mounting hook 104, bends over into the feeding-recreation chamber 192, picks up food, either pellets or seeds, stands and eats them over the catch 162. The pieces he drops, or shuttles out of the way, go through the catch 162 and down the reclamation slide 166. This dropped food lands against the reclamation-stop-door 168, which is removed; by sliding it up, when a colander or a wire basket is held under the end of the reclamation slide 166. The food, the bird has wasted, by scattering or throwing it about during the course of the day, slides out into the basket. The dust can be shaken from the food with the good pieces poured back in the hopper portion 110 for the bird to go through the next day.

Figure 4:
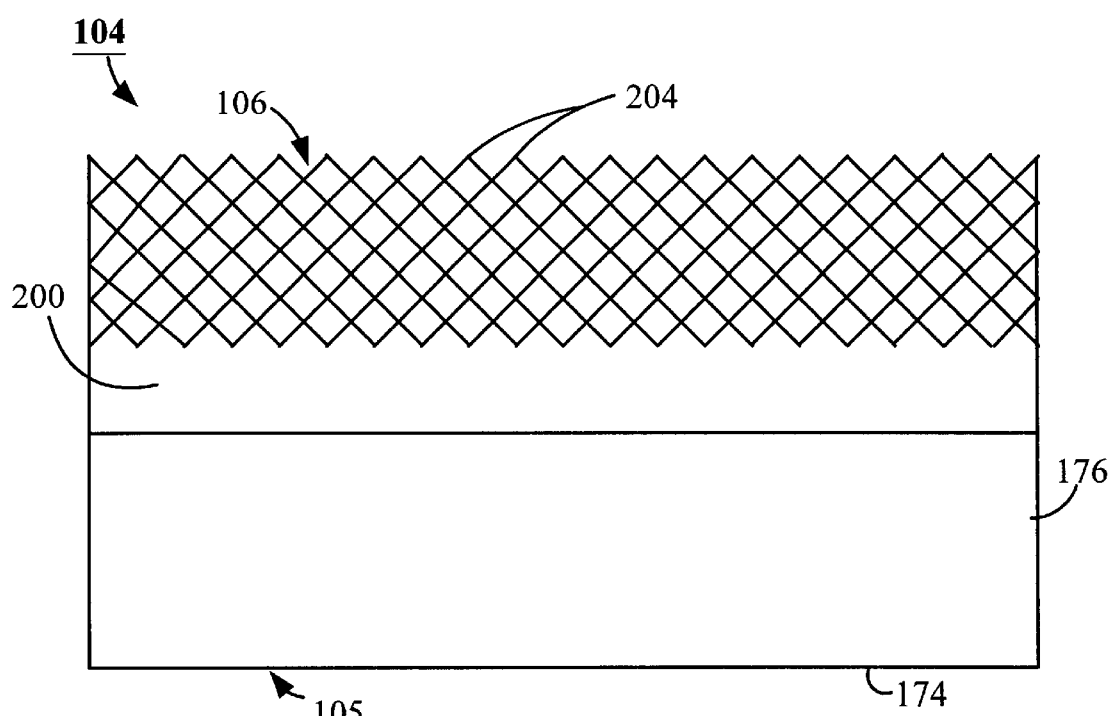
FIG. 4 is an elevational front view showing the manicuring perch mounting hook of the feeder of FIG. 2.

FIG. 4 shows a cross hatch serrated texture 204 imparted on the outside surface 106 and into the main body portion 105 of the manicuring perch mounting hook 104. To impart the serrated texture 204 into the main body portion 105, the serrated texture serving to wear the bird's toenails off in the manner his usual scratching for food would accomplish in the wild, a file pattern is stamped into the main body portion 105 used in forming the manicuring perch mounting hook 104.

Using 0.3125 cm. thick, substantially flat piece of acrylic material as a manicuring perch blank (not shown separately) of a present embodiment, a texture application process, also referred to as a heat stamping process, involves heating the manicuring perch blank to 500 degrees Fahrenheit, a temperature just below its melting point and the temperature at which the manicuring perch blank accepts the texture embossed or heat stamped onto its surface that provides the serrated surface 106 of the manicuring perch 104. The manicuring perch blank, after being produced to size, is placed in a kiln operating at a temperature of 500 degrees Fahrenheit and held in the kiln for 2 minutes. The manicuring perch blank is then transferred to a press with a metallic file mounted within the press. Prior to the transfer of the manicuring perch blank to the press, the metallic file is heated to a temperature of substantially 170 degrees centigrade. While still hot from the kiln, the manicuring perch blank is placed in the press and held in the press for one minute under forty pounds of pressure per square inch. When stamping a manicuring perch blank of 0.625 thicknesses, the kiln time is pushed to 3 minutes at 500 degrees Fahrenheit. However, the temperature pressure and dwell time for the stamping portion of the process remains constant. Once the serration has set the serrated manicuring perch blank (not separately shown) is re-heated and formed into the manicuring perch 106 by bending the serrated manicuring perch blank around a curved fixture. The radius of the curved fixture is determined by the natural grasp of the bird species the manicuring perch is being fashioned to serve.

Tests have shown that a serrated texture 204 embossed on a serrated manicuring perch blank surface will actually file other pieces of plastic, as well as the toughest toenails of the largest Macaws and Cockatoos without taxing the capabilities of the manicuring perch. In addition to the present invention, there are many other applications within the bird world for a surface to be imparted with a serrated textured surface, i.e., perches independent from a feeder 100 (of FIG. 1), toys, and T-stands to name a few. It is also noted the configuration or pattern of the serrated texture 204 need not be a cross-hatch pattern. The serrated texture may take on virtually any form such as diagonal or even random eruptions created by bubbling the surface with heat, or by scribing the outer surface 106 using mechanical means or a laser.

After the stamping, and while still hot, the acrylic piece is formed around a substantially round fixture that has a diameter sized to produce the manicuring perch mounting hook 104 with an outside dimension tailored to the grasp size of the foot of the bird species the feeder 100 (of FIG. 1) is dimensioned to serve.

Figure 5:
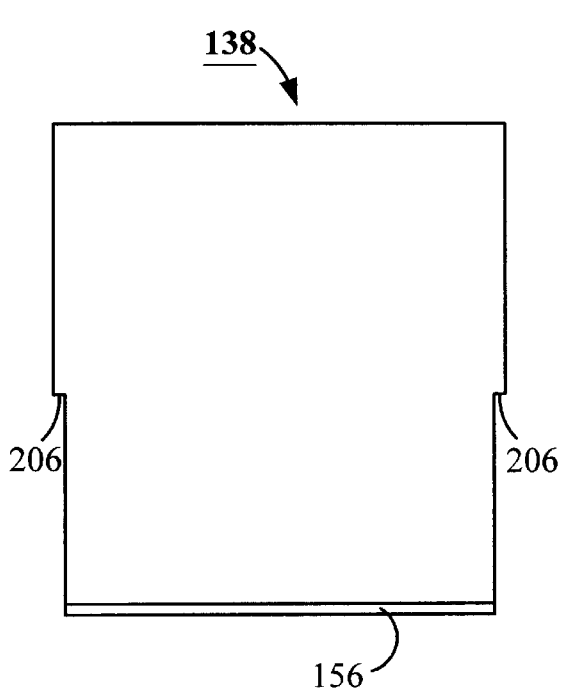
FIG. 5 is a plan view of a manger floor showing a pair of particle egress notches used in forming settling slots of the feeder of FIG. 1.

FIG. 5 shows a pair of particle egress notches 206, one cut into each side of the manger floor 138. A table saw is used for the removal of a predetermined amount of material from the manger floor 138. The amount of material removed varies with the species of bird the feeder is intended to serve and the physical size and type of feed recommended for the care of that species. The pair of particle egress notches 206, in combination with the pair of side panels 102 (of FIG. 2), form the pair of settling slots 154 (of FIG. 1) when the manger floor is sandwiched between and attached to the pair of side panels 102 (of FIG. 2). Each of the pair of settling slots 154 (of FIG. 1) provide an opening between the food dispenser portion 108 (of FIG. 1) of the feeder 100 (of FIG. 1) and the recovery reservoir 164 (of FIG. 1), to allow small food particles and food dust to pass from the manger portion 114 (of FIG. 1) to the food recovery reservoir 164 (of FIG. 1) of the feeder 100. Thereby eliminating both the buildup of the food dust in the corners of the manger portion 114 (of FIG. 1) and the need for the buildup to be chipped away. As covered hereinabove, old food stuck in the corners of any feeder often molds, the settling slots remove the risk of mold by removing the source of the mold, i.e., by eliminating closed corners that promote food dust buildup.

Figure 6:
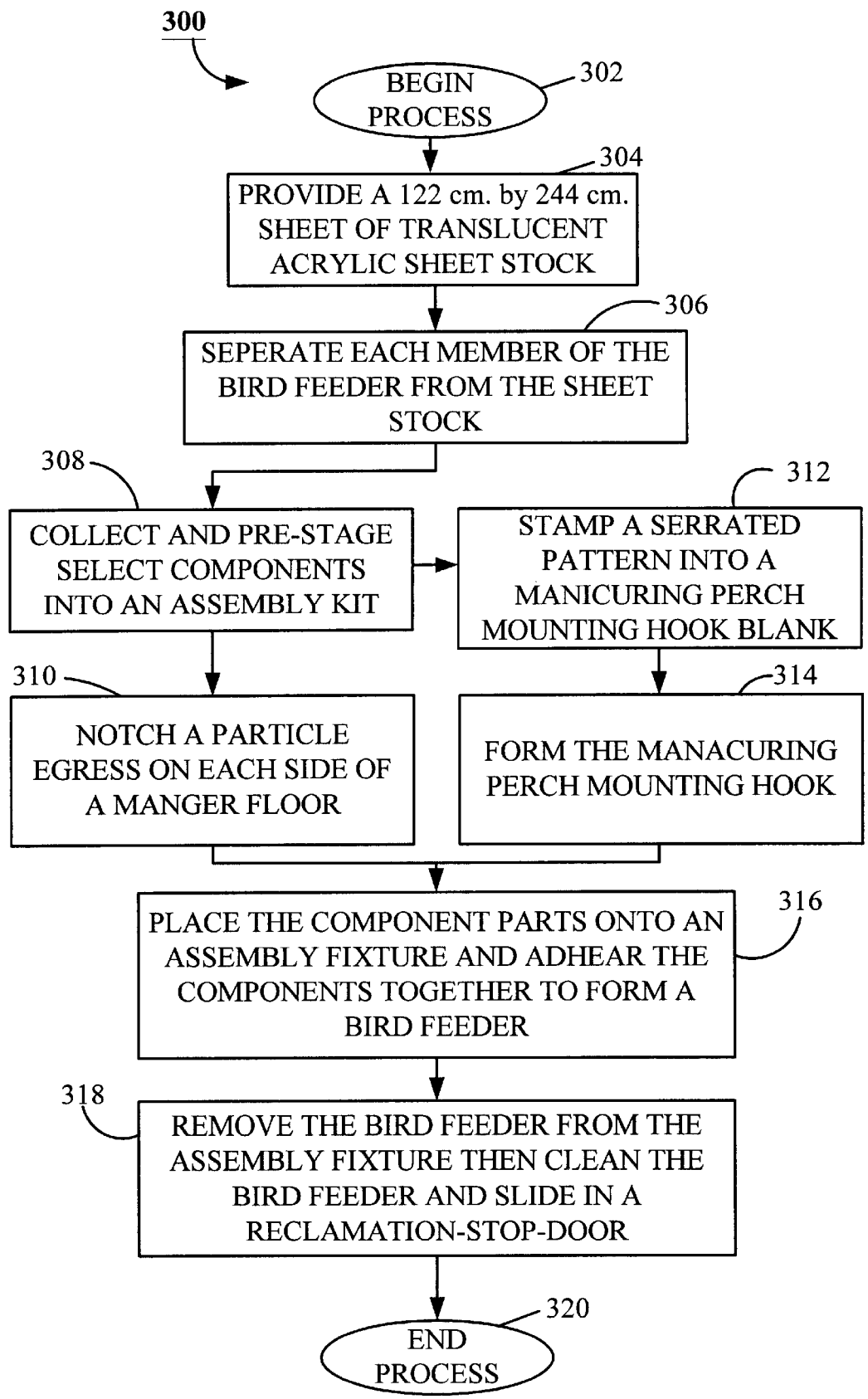
FIG. 6 is a flow diagram showing an assembly method for the feeder of FIG. 1.

FIG. 6 shows a flow diagram of a bird feeder assembly process 300 for making a reduced compression gravity-feed clean food-recycling system with a manicuring perch bird feeder (such as 100) starts at begin process step 302 and continues at process step 304, the provision of a 4 ft. (122 cm.) by 8 ft. (244 cm.) sheet of translucent acrylic material, all of either clear or tinted, with a smooth or pebbled surface. The thickness of the material depends on the species of bird the bird feeder is intended to serve in ranges from a thickness of 1/16 in. (0.159 cm.) to 1/4 in. (0.636 cm.). With a material provided, the bird feeder assembly process 300 continues at step 306 where the material provided by provide step 304 is first divided into a predetermined number of individual strips of substantially 96 in. (244 cm.) length by substantially one of the following widths: 11 in. (28 cm.), 9 in. (23 cm.), 7 in. (18 cm.), 5 in. (12.7 cm.) or 3.5 in. (9 cm.). Next, the individual members, also referred to as component parts, of the bird feeder are separated from selected individual straps, of appropriate width and thickness, into lengths appropriate for the bird feeder type being assembled.

At process step 308, the bird feeder assembly process 300 continues with collecting and combining into a parts kit form, an appropriate number of each member or component part used to assemble a bird feeder specific to a bird species. Then, a manger floor (such as 138) is drawn from the parts kit and passed to a notching process of process step 310, and a manicuring perch member or component part (such as 104) is drawn from the kit and passed to a heat stamp process of process step 312. At process step 310, the material is removed from the manger floor to form a pair of particle egress notches (such as 206), one on each side of the manger floor and then returned to the parts kit.

While the manger floor is undergoing material removal in process step 310, the manicuring perch is undergoing the heat stamp process of process step 312. The heat stamp process of process step 312 includes: placing a manicuring perch blank into a kiln preheated to 500 degrees Fahrenheit, for a period of two minutes to condition the manicuring perch blank for receipt of a serrated surface; preheating a metallic file of a press to a temperature of substantially 170 degrees, the magnetic file used to impart the serration on the manicuring perch blank; aligning the manicuring perch blank within the press; and pressing the magnetic file into the surface of the manicuring perch blank to impart the serration pattern onto the manicuring perch blank to form a serrated manicuring perch blank (not shown separately). Next, the serrated manicuring perch blank is formed into a manicuring perch mounting hook in process step 314.

Once the serration has set, process step 314 forms the serrated manicuring perch blank into the manicuring perch mounting hook by first maintaining the heat of the serrated manicuring perch blank attained during the stamp process step 312 and then bending the serrated manicuring perch blank around a curved fixture. The radius of the curve on the curved fixture is determined by the natural grasp of the bird species the manicuring perch is being fashioned to serve. Having formed the manicuring perch mounting hook, the manicuring perch mounting hook is returned to the parts kit.

In process step 316, a first of a pair of side panels (such as 102) is positioned on an assembly fixture, then a bead of bonding material, such as methylene chloride, is applied to a first side of each of the component parts, each part is then aligned in a position call for by the assembly fixture and pressed into place. Next, a second bead of bonding material is applied to a second side of each of component parts to be sandwiched between the pair of side panels and the second of the pair of side panels was aligned, as indicated by the assembly fixture and placed into pressing contact with the second surface of each of the component parts.

The bird feeder assembly process 300 continues with process step 318. In process step 318 the pair of side panels with the components sandwiched between them is removed from the assembly fixture, cleaned and a reclamation-stop-door (such as 168) is slid into position to form the reduced compression gravity-feed clean food-recycling system bird feeder with a manicuring perch. The bird feeder assembly process 300 then concludes with process step 320, end process.

In accordance with one aspect of a preferred embodiment, a reduced compression gravity-feed clean food-recycling system with a manicuring perch bird feeder (such as 100) includes: a pair of side panels (such as 102) defining a height and a depth of the feeder; a manicuring perch mounting hook (such as 104) with a serrated surface secured between the side panels, the manicuring perch mounting hook secured to the side panels defining a width of the feeder, the serrated surface trims toenails of a bird; a manger floor (such as 154) with a pair of particle egress notches (such as 206) secured between the pair side panels, the egress notches together with the pair of side panels form a pair of settling slots (such as 154) for passage of particles from above the manger floor to below the manger floor; a manger stop adjacent the manger floor and secured between the pair of side panels forming a catch (such as 162) encompassed by the pair of side panels, the manicuring perch mounting hook and the manger stop; a reclamation slide (such as 166) secured between the side panels for collecting particles from the settling slots and the catch; a reclamation-stop-door (such as 168) slidingly adjacent the pair of side panels eschewing discharge of particles collected on the reclamation slide; and, a food recovery reservoir (such as 164) bounded by the reclamation-stop-door, the pair of side panels, the manger floor and the reclamation slide, the food recovery reservoir communicating with the catch for collecting a displaced item of food from the bird in preparation for recycling the displaced item of food for the bird.

Returning to FIG. 1, in addition to the benefits discussed hereinabove, the present invention provides a new and improved bird feeder which offers the bird some of the psychological satisfaction of being the hunter-browser nature intended—without messy harm to his surroundings or waste of feed. The process of collecting the clean feed and recycling the feed enables the bird to go through his food as much as he pleases—as part of his daily self-fulfilling activity and exercise.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the configuration of the serrated texture of the manicuring perch mounting hook may vary depending on the particular application while maintaining substantially the same functionality without departing from the scope and spirit of the present invention. In addition, although the preferred embodiment described herein is directed to a bird feeder, it will be appreciated by those skilled in the art that the teachings of the present invention can be applied to other feeding systems without departing from the scope and spirit of the present invention.

What is claimed is:

1. A reduced compression gravity-feed clean food-recycling system for a feeder for providing clean food to a feeder user, the feeder comprising:

a pair of side panels defining a height and a depth of the feeder;

a manicuring perch mounting hook with a serrated surface secured between the side panels defining a width of the feeder, the serrated surface wearing down toenails of the feeder user while the feeder user eats the clean food provided by the reduced compression gravity-feed clean food-recycling system;

a manger floor with a pair of particle egress notches, the manger floor secured between the pair side panels while providing support for the clean food;

a pair of settling slots established by the pair of particle egress notches, the manger floor and the pair of side panels, the pair of settling slots for passage of particles from above the manger floor to below the manger floor;

a manger stop adjacent the manger floor and secured between the pair of side panels for supporting the clean food adjacent the manger floor;

a catch encompassed by the pair of side panels, the manicuring perch mounting hook, the settling slots and the manger stop, the catch accommodating clean food spilled or discarded from the manger floor; and a reclamation slide secured between the side panels for collecting particles from the settling slots and the catch, and spilled or discarded clean food from the manger floor.

2. The feeder of claim 1 further comprising:

a first cleaning port for cleaning the feeder with compressed air, the first cleaning port formed by the cooperation of the food dispenser back, the manger floor and the pair of side panels;

a second cleaning port offset from and in line with the first cleaning port, the second cleaning port formed by the cooperation of the manger stop, the manger floor and the pair of side panels, the second cleaning port for cleaning the feeder with compressed air; and a third cleaning port offset from and in line with the first cleaning port and the second cleaning port, the third cleaning port formed by the cooperation of the manicuring bird perch, the reclamation slide and the pair of side panels, the third cleaning port for cleaning the feeder with compressed air.

3. The feeder of claim 1 in which the feeder user is a bird of a predetermined bird species and in which the feeder further comprising:

a sloped volume control wall secured between the pair of side panels for promoting non-compression of the clean food for the bird;

a feeding slide secured between the pair if side panels providing support for the clean food for the bird; and a feeding-recreation chamber with a chamber opening formed by the cooperation of the sloped volume control wall, the feeding slide, the manger floor, the manger stop, the catch, the manicuring perch and the pair of side panels, the feeding-recreation chamber opening is ergonomically sized for the bird species of the bird served the clean food to invite the bird to partake in the food while precluding the bird from turning its tail into the feed-recreation chamber and defecating on the food, the feeding-recreation chamber further providing a view without bars in two directions.

4. The feeder of claim 1 in which the feeder user is a bird and in which the feeder further comprising:

a reclamation-stop-door slidingly adjacent the pair of side panels eschewing premature discharge of particles collected on the reclamation slide; and a food recovery reservoir-bounded by the reclamation-stop-door, the pair of side panels, the manger floor, the reclamation slide and the manger stop, the food recovery reservoir communicating with the catch for collecting a displaced item of food from the bird in preparation for recycling the displaced item of clean food for the bird.

5. The feeder of claim 4 further comprising a food dispenser portion for automatic dispensing of food to the bird, the food dispenser comprising:

a food dispenser back secured between the pair of side panels to contain the clean food for the bird;

a feeding slide offset from the food dispenser back, secured between the pair of side panels to provide initial support for the clean food;

a hopper portion formed by the feeding slide cooperating with the food dispenser back and the pair of side panels, the hopper portion for initial storage of the clean food for the bird;

a sloped volume control wall communicating with the feeding slide, offset from the food dispenser back and secured between the pair of side panels, the sloped volume control wall having a top edge, a bottom edge and an inner surface between the top edge and the bottom edge, the inner surface sloping away from the food dispenser back creating an expansion in volumetric space between the sloped volume control wall and the food dispenser back that commences at the top edge and proceeds to the bottom edge, thereby promoting non-compression of the clean food for the bird;

a silo portion formed by the sloped volume control wall cooperating with the feeding slide, the pair of side panels and the food dispenser back, the silo portion for intermediate storage of the clean food for the bird; and a manger portion formed by the cooperation of the pair of sidewalls, the manger floor, the bottom edge of the sloped volume control wall, the manger stop and the pair of side panels, the manger portion for final storage and presentation of the clean food for the bird to the bird.

6. The feeder of claim 4 further comprising a food dispenser portion for automatic dispensing the clean food to the bird, the food dispenser comprising:

a food dispenser back secured between the pair of side panels to contain the clean food for the bird;

a feeding slide offset from the food dispenser back, secured between the pair of side panels to provide initial support for the clean food;

a hopper portion formed by the feeding slide cooperating with the food dispenser back and the pair of side panels, the hopper portion for initial storage of the clean food for the bird;

a sloped volume control wall communicating with the feeding slide, offset from the food dispenser back and secured between the pair of side panels, the sloped volume control wall having a top edge, a bottom edge and an inner surface between the top edge and the bottom edge, the inner surface sloping away from the food dispenser back creating an expansion in volumetric space between the sloped volume control wall and the food dispenser back that commences at the top edge and proceeds to the bottom edge thereby promoting non-compression of the clean food for the bird;

a silo portion formed by the sloped volume control wall cooperating with the feeding slide, the pair of side panels and the food dispenser back, the silo portion for intermediate storage of the clean food for the bird;

a manger portion formed by the cooperation of the pair of sidewalls, the manger floor, the bottom edge of the sloped volume control wall, the manger stop and the pair of side panels, the manger portion for final storage and presentation of the clean food for the bird to the bird;

a feeding-recreation chamber with a chamber opening formed by the cooperation of the sloped volume control wall, the feeding slide, the manger floor, the manger stop, the catch, the manicuring perch and the pair of side panels, the feeding-recreation chamber opening is ergonomically sized for the bird species of the bird served the clean food to invite the bird to partake in the food while precluding the bird from turning its tail into the feed-recreation chamber and defecating on the food, the feeding-recreation chamber further providing a view without bars in two directions;

a first cleaning port for cleaning the feeder with compressed air, the first cleaning port formed by the cooperation of the food dispenser back, the manger floor and the pair of side panels;

a second cleaning port offset from and in line with the first cleaning port, the second cleaning port formed by the cooperation of the manger stop, the manger floor and the pair of side panels, the second cleaning port for cleaning the feeder with compressed air; and a third cleaning port offset from and in line with the first cleaning port and the second cleaning port, the third cleaning port formed by the cooperation of the manicuring bird perch, the reclamation slide and the pair of side panels, the third cleaning port for cleaning the feeder with compressed air.

7. A method of assembling a reduced compression gravity-feed clean food-recycling system for a feeder for use by a feeder user by steps comprising:

(a) providing a sheet of material for use in producing component parts of the feeder;

(b) separating each component part of the feeder from the sheet of material for use in assembling the feeder;

(c) collecting and pre-staging select component parts including a manger floor into an assembly kit for use in assembling a predetermined type of feeder;

(d) notching a particle egress notch into the manger floor for use in forming a settling slot;

(e) embedding a serrated pattern into a manicuring perch mounting hook to provide a means for manicuring a toenail of the feeder user while the feeder user is feeding from the feeder;

(f) forming the manicuring perch mounting hook into a predetermined shape sized to accommodate the grasp of the feeder user and provide a means for attaching the feeder to a bird cage;

(g) placing each component part onto an assembly fixture and linking the components one to the other to form the feeder; and (h) removing the linked components from the assembly fixture and installing a reclamation-stop-door to form the feeder.

8. The method of claim 7 in which the particle egress notch of notching step (d) is notched into the manger floor by steps comprising:

(d1) issuing the manger floor from the assembly kit to a notching process for notching the egress notch into the manger floor;

(d2) aligning the manger floor into assembly tooling for material removal wherein the assembly tool is a saw; and (d3) removing a predetermined amount of material from the manger saw to form the egress notch.

9. The method of claim 7 in which the feeder user is a bird of a bird species.

10. The method of claim 9 in which the select component parts of collecting step (c) are component parts specific to the bird species using the feeder.

11. The method of claim 10 in which the serrated pattern of embedding step (e) is formed by steps comprising:

(e1) placing the manicuring perch mounting hook into a kiln to heat the manicuring perch mounting hook to a predetermined temperature for a predetermined period of time to prepare a surface of the manicuring perch mounting hook for receipt of the serrated pattern to be imparted on the surface of the manicuring perch mounting hook;

(e2) pre-heating a serration pattern tool to a predetermined temperature for use in imparting the serrated pattern on the surface of the manicuring perch mounting hook;

(e3) removing the manicuring perch mounting hook from the kiln and placing the manicuring perch mounting hook in a serration fixture to align the manicuring perch mounting hook with the serration pattern tool; and (e4) imparting the serrated pattern into the manicuring perch mounting hook by placing the serration tool into direct contact with the manicuring perch mounting hook surface and applying a predetermined force for a predetermined period of time to the serration tool to embed the serration pattern into the manicuring perch mounting hook.

12. The method of claim 11 in which the predetermined shape of the manicuring perch mounting hook of forming step (f) is formed by steps comprising:

(f1) removing the manicuring perch mounting hook from the serration fixture in preparation for forming the manicuring perch mounting hook into a predetermined shape;

(f2) placing the manicuring perch mounting hook into a manicuring perch forming fixture shaped to accommodate the grasp of the bird of the species of bird using the feeder;

(f3) applying heat to the manicuring perch mounting hook to a point of malleability to allow the manicuring perch mounting hook to be deformed; and (f4) deforming the manicuring perch mounting hook around a shape tool while maintaining the heat applied to the manicuring perch mounting hook sufficient to maintain malleability of the manicuring perch mounting hook while applying force to the manicuring perch mounting hook to form the manicuring perch mounting hook.

13. The method of claim 12 in which the shape tool of deforming step (f4) has a diameter determined by the grasp of the bird of the species of bird using the feeder.

14. The method of claim 13 in which the manicuring perch mounting hook formed deforming step (f4) has an anchor leg, a containment leg and an eye portion, the anchor leg and the containment leg defining a hook portion and a cross section of the shape tool defining a cross section of the eye portion of the manicuring perch mounting hook, the anchor leg forming the major front partition of the feeder as well as the opposing side of the hook portion to anchor the feeder securely to the bird cage.

15. A reduced compression gravity-feed clean food-recycling system bird feeder for providing clean food to a bird, the reduced compression gravity-feed clean food-recycling system bird feeder comprising:

a pair of side panels defining a height and a depth of the reduced compression gravity-feed clean food-recycling system bird feeder; and a manicuring perch mounting hook with a serrated surface secured between the side panels defining a width of the feeder, the serrated surface wearing down toenails of the bird while the bird eats the clean food provided by the reduced compression gravity-feed clean food-recycling system bird feeder, the reduced compression gravity-feed clean food-recycling system bird feeder assembled by steps comprising:

(a) providing a sheet of material for use in producing component parts of the feeder;

(b) separating each component part of the feeder from the sheet of material for use in assembling the feeder;

(c) collecting and pre-staging select component parts into an assembly kit for use in assembling a predetermined type of feeder;

(d) notching a particle egress notch into the manger floor for use in forming a settling slot;

(e) embedding a serrated pattern into a manicuring perch mounting hook to provide a means for manicuring a toenail of the bird while the bird is feeding from the reduced compression gravity-feed clean food-recycling system bird feeder;

(f) forming the manicuring perch mounting hook into a predetermined shape sized to accommodate the grasp of the bird and provide a means for attaching the reduced compression gravity-feed clean food-recycling system bird feeder to a bird cage;

(g) placing each component part onto an assembly fixture and linking the components one to the other to form the reduced compression gravity-feed clean food-recycling system bird feeder; and (h) removing the linked components from the assembly fixture and installing a reclamation-stop-door to form the reduced compression gravity-feed clean food-recycling system bird feeder.

16. The reduced compression gravity-feed clean food-recycling system bird feeder of claim 15 in which the select component parts are component parts specific to the bird of a species of bird using the reduced compression gravity-feed clean food-recycling system bird feeder.

17. The reduced compression gravity-feed clean food-recycling system bird feeder of claim 15 in which the particle egress notch of notching step (d) is notched into the manger floor by steps comprising:

(d1) issuing the manger floor from the assembly kit to a notching process for notching the egress notch into the manger floor;

(d2) aligning the manger floor into assembly tooling for material removal wherein the assembly tool is a saw; and (d3) removing a predetermined amount of material from the manger saw to form the egress notch.

18. The reduced compression gravity-feed clean food-recycling system bird feeder of claim 15 in which the serrated pattern of embedding step (e) is formed by steps comprising:

(e1) placing the manicuring perch mounting hook into a kiln for a predetermined period of time to heat the manicuring perch mounting hook to a predetermined temperature to prepare the manicuring perch mounting hook for receipt of the serrated pattern to be imparted into the manicuring perch mounting hook;

(e2) pre-heating a serration pattern tool to a predetermined temperature for use in imparting the serrated pattern into the manicuring perch mounting hook;

(e3) removing the manicuring perch mounting hook from the kiln and placing the manicuring perch mounting hook in a serration fixture to align the manicuring perch mounting hook with the serration pattern tool; and (e4) imparting the serrated pattern into the manicuring perch mounting hook by placing the serration tool into direct contact with the manicuring perch mounting hook surface and applying a predetermined force for a predetermined period of time to the serration tool to embed the serration pattern into the manicuring perch mounting hook.

19. The reduced compression gravity-feed clean food-recycling system bird feeder of claim 18 in which the predetermined shape of the manicuring perch mounting hook of forming step (f) is formed by steps comprising:

(f1) removing the manicuring perch mounting hook from the serration fixture in preparation for forming the manicuring perch mounting hook into a predetermined shape;

(f2) placing the manicuring perch mounting hook into a manicuring perch forming fixture shaped to accommodate the grasp of the bird of the species of bird using the feeder;

(f3) applying heat to the manicuring perch mounting hook to a point of malleability to allow the manicuring perch mounting hook to be deformed; and (f4) deforming the manicuring perch mounting hook around a shape tool while maintaining the heat applied to the manicuring perch mounting hook sufficient to maintain malleability of the manicuring perch mounting hook while applying force to the manicuring perch mounting hook to form the manicuring perch mounting hook.

20. The reduced compression gravity-feed clean food-recycling system bird feeder of claim 19 in which the shape tool of deforming step (f4) has a diameter determined by the grasp of the bird of the species of bird using the reduced compression gravity-feed clean food-recycling system bird feeder.

21. The reduced compression gravity-feed clean food-recycling system bird feeder of claim 20 in which the manicuring perch mounting hook of deforming step (f4) has an anchor leg, a containment leg and an eye portion, the anchor leg and the containment leg defining a hook portion and a cross section of the shape tool defining a cross section of the eye portion of the manicuring perch mounting hook, the anchor leg forming the major front partition of the feeder as well as the opposing side of the hook portion to anchor the reduced compression gravity-feed clean food-recycling system bird feeder securely to the bird cage.

22. A manicuring perch for a bird of a species of bird comprising:

a main body portion supporting a serrated pattern embedded into a surface of the main body portion, the serrated pattern for manicuring a toenail of the bird while the bird moves on the serrated pattern; and an eye portion with an outer surface cross section determined by the grasp of the bird of the species of bird using the manicuring perch, the manicuring perch formed by steps comprising:

(a) placing the manicuring perch into a kiln for a predetermined period of time to heat the manicuring perch to a predetermined temperature to prepare the manicuring perch for receipt of the serrated pattern to be imparted into the manicuring perch;

(b) pre-heating a serration pattern tool to a predetermined temperature for use in imparting the serrated pattern into the manicuring perch;

(c) removing the manicuring perch from the kiln and placing the manicuring perch in a serration fixture to align the manicuring perch with the serration pattern tool; and (d) imparting the serrated pattern into the manicuring perch by placing the serration tool into direct contact with the manicuring perch surface and applying a predetermined force for a predetermined period of time to the serration tool to embed the serration pattern into the manicuring perch.

23. The manicuring perch of claim 22 in which the eye portion is formed by steps comprising:

(a) removing the manicuring perch from the serration fixture in preparation for forming the manicuring perch into a predetermined shape;

(b) placing the manicuring perch into a manicuring perch forming fixture shaped to accommodate the grasp of the bird of the species of bird using the manicuring perch;

(c) applying heat to the manicuring perch to a point of malleability to allow the manicuring perch to be deformed; and (d) deforming the manicuring perch around a shape tool while maintaining the heat applied to the manicuring perch sufficient to maintain malleability of the manicuring perch while applying force to the manicuring perch to form the manicuring perch.

24. The manicuring perch of claim 23 in which the shape tool of deforming step (d) has a diameter determined by the grasp of the bird of the species of bird using the manicuring perch.

* * * * *